(12) United States Patent
Krings

(10) Patent No.: US 7,130,744 B2
(45) Date of Patent: Oct. 31, 2006

(54) METHOD FOR DETERMINING AND COMPENSATING THE SCALE FACTOR ERROR CAUSED BY A WAVELENGTH CHANGE IN A GPS-BASED INERTIAL NAVIGATION SYSTEM

(75) Inventor: Manfred Krings, March (DE)

(73) Assignee: LITEF GmbH, Freiburg (DE)

( * ) Notice: Subject to any disclaimer, the term of this patent is extended or adjusted under 35 U.S.C. 154(b) by 0 days.

(21) Appl. No.: 10/524,958

(22) PCT Filed: Jul. 18, 2003

(86) PCT No.: PCT/EP03/07830

§ 371 (c)(1),
(2), (4) Date: Feb. 18, 2005

(87) PCT Pub. No.: WO2004/023077

PCT Pub. Date: Mar. 18, 2004

(65) Prior Publication Data

US 2006/0149473 A1    Jul. 6, 2006

(30) Foreign Application Priority Data

Aug. 20, 2002    (DE) ............................... 102 38 061

(51) Int. Cl.
*G01C 21/28* (2006.01)

(52) U.S. Cl. .................. 701/221; 701/220; 244/177; 244/79; 244/165; 356/460; 356/462

(58) Field of Classification Search ............... 701/221, 701/220; 244/177, 179, 165; 356/460, 462, 356/458, 459; 73/1.77, 1.75
See application file for complete search history.

(56) References Cited

U.S. PATENT DOCUMENTS

| 5,067,084 A | 11/1991 | Kau |
| 5,365,338 A | 11/1994 | Bramson |
| 5,469,158 A | 11/1995 | Morita |
| 5,527,003 A | 6/1996 | Diesel et al. |
| 5,617,317 A | 4/1997 | Ignagni |
| 6,298,288 B1 | 10/2001 | Li et al. |

FOREIGN PATENT DOCUMENTS

| DE | 19651543 | 7/1998 |
| EP | 0288032 | 10/1988 |

OTHER PUBLICATIONS

Myron Kayton et al., *Avionics Navigation Systems*, Ed. 2 (1997), pp. 72-98.
Lothar Uhlig et al., "Automatisierung der Navigation", *Leitfaden der Navigation*, (1984), Sections 5.1-5.4 ("Statische Optimierung in der Navigation".

*Primary Examiner*—Thomas G. Black
*Assistant Examiner*—Marie A. Weiskopf
(74) *Attorney, Agent, or Firm*—Elliott N. Kramsky

(57) ABSTRACT

In a GPS-supported inertial attitude and heading reference system equipped with a Kalman correction filter and a multiple axis fiber optic gyroscope, the invention provides for only that scale factor error which is determined for the measurement axis (e.g. the vertical axis) with relatively fast motion dynamics to be used as the Kalman filter correction value for the scale factor error correction for all the measurement axes of the FOG to determine and compensate for the scale factor error caused by changes in the wavelength of a common light source. The scale factor error correction is used only with a long time constant.

2 Claims, 2 Drawing Sheets

METHOD FOR DETERMINING AND COMPENSATING THE SCALE FACTOR ERROR CAUSED BY A WAVELENGTH CHANGE IN A GPS-BASED INERTIAL NAVIGATION SYSTEM

BACKGROUND

1. Field of the Invention

The present invention relates to GPS-supported inertial attitude and heading reference (INS-Systems) systems having Kalman filters. More particularly, this invention pertains to a method for determination and compensation of scale factor error in such a system due to wavelength changes in multiple-axis fiber optic gyroscopes having a common light source.

2. Description of the Prior Art

DE 196 51 543 C1 teaches subtraction of attitude and heading angles produced by a GPS receiver from the corresponding data supplied by an inertial sensor for iterative correction of a platform calculation by means of a Kalman filter, in a attitude and heading reference system including an inertial system that is assisted by means of a GPS receiver. Such method obtains an accurate attitude/heading reference of comparatively wide bandwidth that is independent of acceleration sensors. Correction models for GPS/INS mechanizations for attitude and heading reference systems in which INS values are corrected by a Kalman filter with different disturbance variables are disclosed in Kayton and Fried, *Avionics Navigation Systems, Second Edition* (1997), pgs. 72–98.

For single axis, GPS-supported track control systems which are equipped with a gyroscope and Kalman filter correction, U.S. Pat. No. 5,469,158 discloses the scale factor errors caused by external influences (temperature, humidity) on the system electronics and optics being compensated for by a calibration during manufacture and by scale factor control of the gyroscope. A multiple axis track and attitude reference system that is fed from a common light source and, in particular, the scale factor error which follows from a change in the light wavelength are not addressed.

The inertial sensor system with GPS assistance described in U.S. Pat. No. 5,617,317 is primarily intended to improve the heading accuracy with respect to true North, which is considered to be of greater importance than the roll and pitch axes of an aircraft.

It is also generally known to estimate the errors of inertial sensors (i.e., zero error (bias), scale factor and axis alignment error) in INS/GPS systems with the aid of external information using a Kalman filter technique. Such estimated values are then utilized to correct sensor data. Satellite navigation systems, such as the United States Global Positioning System ("GPS") are particularly suitable as they provide position and velocity virtually continuously, with high accuracy and without drift. Kalman filters make it possible to use the difference between the position and velocity data from the GPS and the inertial system to estimate inertial sensor errors and to thoroughly perform appropriate corrections.

However as mentioned above, the determination of sensor errors with the aid of external assistance and Kalman filter techniques, is dependent upon a specific amount of motion dynamics of the vehicle (e.g. an aircraft) as error mechanisms of the inertial sensors can only be stimulated in this way. They can then be observed via the Kalman filter.

Such vehicles generally move in a horizontal plane, with pitch and roll movements assuming relatively large values for only a short time. On the other hand, GPS reception is lost during very major attitude angle changes (e.g. aircraft engaged in aerobatics) when the GPS antenna can no longer receive satellite signals. As a result, the scale factor can then no longer be estimated or determined satisfactorily. Furthermore, any increase in scale factor error resulting from a change in the wavelength of the light source will become evident only after the systems have been in use for a relatively long time.

The reduction in accuracy in attitude/heading reference systems generally remains unknown as the system error is largely suppressed by vertical and magnetic sensor assistance, and has therefore been found to be relatively insignificant. However, an improvement in scale factor accuracy and its long-term stability is absolutely essential for future tasks, particularly in assisted inertial navigation and when attitude angle accuracy is subject to stringent requirements.

SUMMARY OF THE INVENTION

It is therefore an object of the invention to provide a method for improving scale factor accuracy, particularly for a GPS-supported inertial attitude and heading reference system equipped with a multiple axis fiber-optic gyroscope that is fed from a common light source.

The preceding object and others are addressed by the invention which provides a method for determining the compensation for scale error due to changes in wavelength in multiple axis fiber-optic gyroscopes ("FOGs") fed from a common light source in a GPS-supported inertial attitude and heading reference system equipped with Kalman filter correction. Such method utilizes the scale factor error determined for one axis with relatively fast motion dynamics as the Kalman filter correction value for the scale factor error correction for all the measurement axes of the FOG having slower motion dynamics.

The preceding and other features of the invention will become further apparent from the detailed description that follows. Such description is accompanied by a set of drawing figures. Numerals of the drawing figures, corresponding to those of the written specification, point to the features of the invention with like numerals referring to like features throughout both the drawing figures and the written specification.

DETAILED DESCRIPTION OF THE PREFERRED EMBODIMENT

Figure 1:
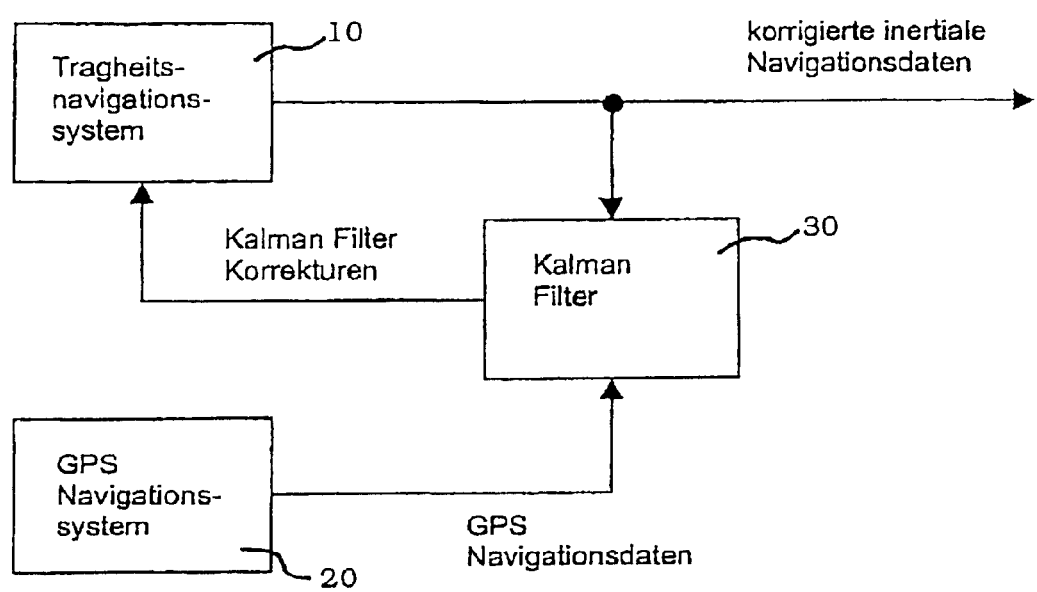
FIG. 1 is a functional block diagram of an inertial navigation system, supported by GPS data and including Kalman filter correction.

FIG. 1 is a functional block diagram of an inertial navigation system, supported by GPS data and including Kalman filter correction. The scale factor of a fiber optic gyroscope within an inertial navigation system 10 is governed predominantly by two factors. The Sagnac phase, which is produced by an external spin rate in the FOG (not illustrated), is governed by the wavelength (or frequency) of light in the glass fiber and the geometric dimensions of the fiber coil (the area enclosed by the winding). In a resetting system, the scaling of the reset (scaling: rotation angle increment/Sagnac phase) in the fiber gyro control loop governs the scale factor.

Figure 2:
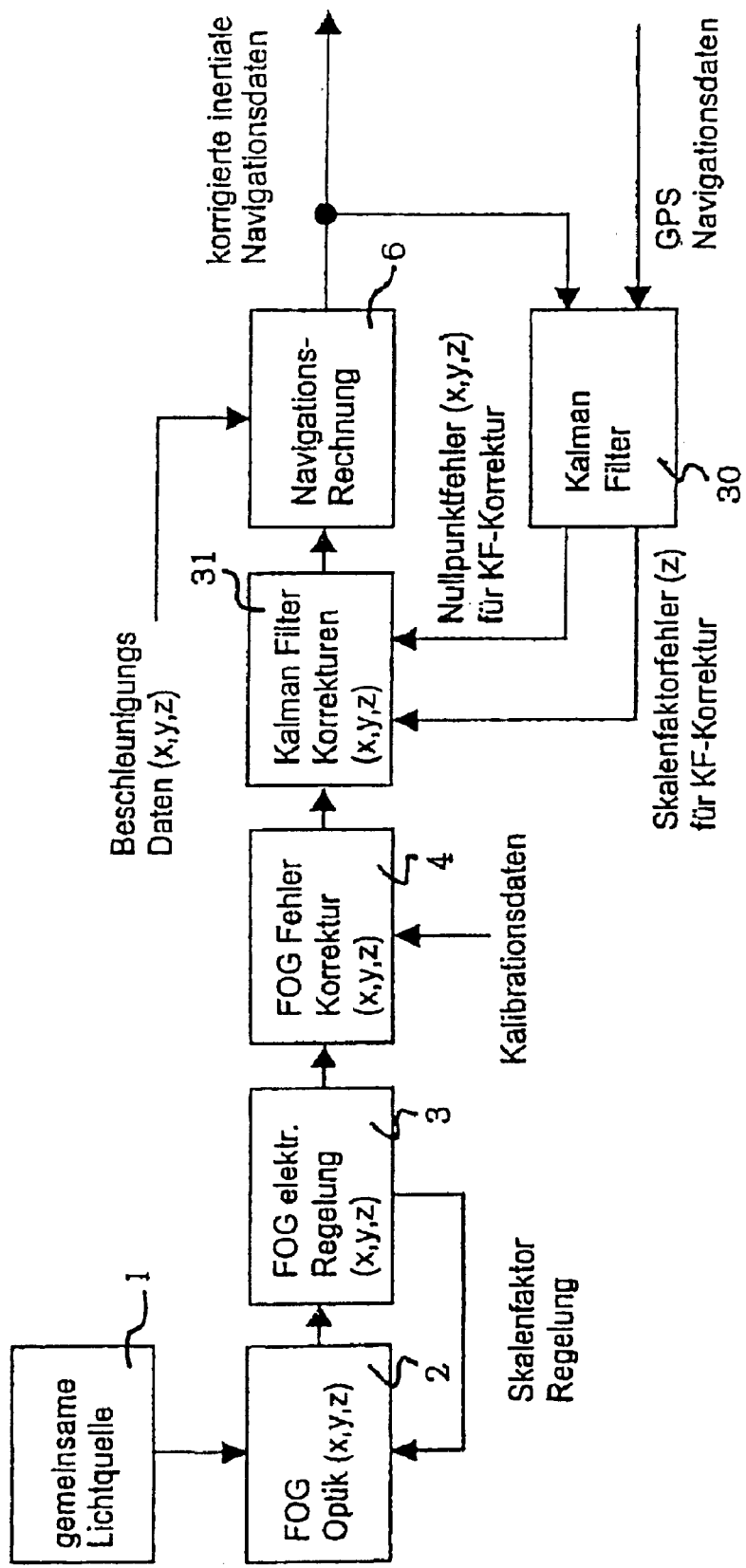
FIG. 2 is a detailed functional block diagram for illustrating error correction, in particular scale factor correction, in accordance with the method of the invention.

FIG. 2 is a detailed functional block diagram for illustrating error correction, scale factor correction in particular, in accordance with the method of the invention. In a multiple (e.g. three) axis FOG architecture 2 fed from a common light source 1, electrical scale factor is determined and monitored by an auxiliary control loop 3 of the FOG electronics. On the other hand, scale factor error, which is influenced by the geometric/mechanical dimensions of the FOG sensor coils, is recorded by the system calibration (calibration data), and compensated for by means of a FOG error correction 4. The wavelength of the common light source 1 is taken into account indirectly in such system calibration and manufacturing errors are thus corrected. Changes in the wavelength of the common light source 1 during operation are no longer recorded. To this extent, the functional circuit diagram of FIG. 1 illustrates the prior art, an inertial navigation system 10 supported by a GPS navigation system 20 using a Kalman filter 30 in which corrected navigation data on the output side is passed to a higher-level computer system.

The problems associated with changes in scale factor that occur, for example, as a result of aging of the light source 1 are known. In the past, two relatively complex methods have been employed to solve this problem. In the first method, a laser light source is utilized in which the spectrum required for FOG operation is produced by other optical elements. The additional optical components add expense while the lengths of fiber required is virtually twice as long as a result of the longer wavelength of the light sources. Another option is direct measurement of the wavelength, making it possible to compensate computationally for the associated scale factor error. The interferometric test layer required for this requires a number of additional optical and electrical components, again making the overall system considerably more expensive. No marketable and competitive solution employing this option exists.

The invention makes use, inter alia, of the insight that a change in the wavelength of the common light source 1 for all three measurement axes of a FOG triad has the same effect on all three measurement axes. This is based on the idea, in accordance with the invention, of employing the scale factor error of the vertical measurement axis z, which can be accurately determined, for the two horizontal measurement axes x, y of the fiber-optic system.

One advantageous embodiment of the invention takes additional account of the fact that the horizontal axes x and y constitute the governing factor of the safety-critical attitude angles so that the scale factor error correction should only be carried out with a long time constant. In this case, it is important that the change in wavelength and, thus, the increase in scale factor error, be caused by aging of the light source over a period of several months. The precise relationship between the period of use and the wavelength shift has not been previously investigated or statistically recorded. In addition to the time factor, environment (temperature, vibration, etc) also exerts a significant influence. When repairs are carried out, it has been necessary to replace light sources, or to recalibrate the system, after light source operation of only 8 to 12 months. The time constant for correction of the Kalman filter should thus be in the range 10 and 20 hours, with the most recently estimated error value used for each new flight. Consideration of a long time constant is accordingly not problematic from the point of view of safety as only comparatively slow changes in light wavelength need be expected.

Referring to FIG. 2, the scale factors of the axes x, y and z are corrected or compensated for, in addition to specific bias error terms, for all three measurement axes in the system block 31 in order to correct system errors in the Kalman filter 30, to be precise, considering only one previously determined scale factor error for the vertical measurement axis z. The corrected data is then passed, together with acceleration data for all three axes x, y, z, to the navigation calculation 6, and the result is fed back with the GPS navigation data to the Kalman filter 30.

The solutions and advantages of the invention can be summarized as follows:

1. In a GPS-supported inertial attitude and heading reference system having a number of FOG sensors fed from a common light source, any scale factor error is compensated uniformly for all measurement axes using a Kalman filter technique with the aid of system information obtained from a measurement axis which is subject to relatively fast dynamics.

2. This error correction is preferably used with a long term constant to prevent short-term disturbance in the supporting sensor (e.g. the FOG sensor) for a vertical axis, and the possibly associated erroneous estimates from corrupting the inertial system. In order to prevent an incorrect estimate of a Kalman filter from corrupting the system, it is advantageous to introduce a limit for the correction, and to emit a warning or a maintenance demand upon reaching such limit.

3. In contrast to other possible known or proposed solutions, the invention achieves a reliable reduction of the scale factor error for complete FOG systems, without incurring additional hardware costs.

The invention is thus based on the observation and finding that, although the scale factor can be determined for the vertical measurement axis of a three-axis inertial attitude and heading reference system, it cannot be estimated satisfactorily for the horizontal measurement axes. This results in good accuracy in the case of heading changes, although large attitude errors occur in the presence of large attitude angle changes. Thus, in one advantageous embodiment of the invention, the scale factor error determined for the vertical z axis in a three-axis attitude and heading reference system is used for scale factor error correction, for error compensation for the other measurement axes x, y.

The invention links the technical capabilities of the Kalman filter with a modern FOG technology to achieve better utilization and to provide considerably better compensation of scale factor for all three measurement axes.

While the invention has been disclosed with reference to its presently-preferred embodiment, it is not limited thereto. Rather, it is limited only insofar as it is defined by the following set of patent claims and includes within its scope all equivalents thereof.

What is claimed is:

1. A method for determination of and compensation for a scale factor error caused by changes in the wavelength of a multiple axis fiber-optic gyroscope (FOG) which is fed from a common light source, in a GPS-supported inertial track and attitude reference system that is equipped with Kalman correction wherein the scale factor error determined for an axis with comparatively fast motion dynamics relative to the motion dynamics of the other axes is used as the Kalman filter correction value for the scale factor error correction for all of the measurement axes of the FOGs with slower dynamics, with the error correction being carried out with a time constant which is long in comparison to expected short-term error sources which cannot be modulated or compensated for.

2. The method as claimed in claim 1 for a three-axis track and attitude reference system, wherein the scale factor error determined for the vertical axis (z) is used for error compensation for the other measurement axes (x, y) for scale factor error correction.

* * * * *